United States Patent
Tang et al.

(10) Patent No.: US 11,580,974 B2
(45) Date of Patent: Feb. 14, 2023

(54) METHOD FOR EXITING A VOICE SKILL, APPARATUS, DEVICE AND STORAGE MEDIUM

(71) Applicant: Baidu Online Network Technology (Beijing) Co., Ltd., Beijing (CN)

(72) Inventors: Huan Tang, Beijing (CN); Xiao Zhou, Beijing (CN); Liangcheng Wu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 292 days.

(21) Appl. No.: 16/914,564

(22) Filed: Jun. 29, 2020

(65) Prior Publication Data

US 2021/0005193 A1 Jan. 7, 2021

(30) Foreign Application Priority Data

Jul. 2, 2019 (CN) .......................... 201910587670.0

(51) Int. Cl.
*G10L 15/22* (2006.01)
*G10L 15/18* (2013.01)
*G10L 15/19* (2013.01)

(52) U.S. Cl.
CPC .......... *G10L 15/22* (2013.01); *G10L 15/1815* (2013.01); *G10L 15/19* (2013.01); *G10L 2015/223* (2013.01)

(58) Field of Classification Search
CPC ..... G10L 15/22; G10L 15/1815; G10L 15/19; G10L 2015/223; G10L 15/1822; G10L 15/08; G10L 15/26
See application file for complete search history.

(56) References Cited

U.S. PATENT DOCUMENTS 6,505,155 B1 * 1/2003 Vanbuskirk ............. G10L 15/22
704/E15.04
6,978,247 B1 12/2005 Bogart et al.
(Continued)

FOREIGN PATENT DOCUMENTS

CN 102538143 A 7/2012
CN 103414830 A 11/2013
(Continued)

OTHER PUBLICATIONS

Office Action for corresponding Chinese patent application No. 201910587670.0 dated Jan. 24, 2022 with English translation, eight pages.
(Continued)

*Primary Examiner* — Abul K Azad
(74) *Attorney, Agent, or Firm* — Harness, Dickey & Pierce, P.L.C.

(57) ABSTRACT

A method for exiting a voice skill, an apparatus, a device, and a storage medium are provided by embodiments of the present disclosure, wherein a user voice instruction is received; a target exit intention corresponding to the user voice instruction is identified according to the user voice instruction and a grammar rule of a preset exit intention; and a corresponding operation is executed on a current voice skill of a device according to the target exit intention. The embodiments of the present disclosure refine and expand the user's exit intention. After the target exit intention to which the user voice instruction belongs is identified, the corresponding operation is executed according to the target exit intention so as to meet the users' different exit requirements for the voice skills, enhance the fluency and convenience of user interaction with the device and improve the user's exit experience when using the voice skills.

15 Claims, 2 Drawing Sheets

(56) References Cited

U.S. PATENT DOCUMENTS

| | | | |
|---|---|---|---|
| 9,570,086 B1* | 2/2017 | Sanders | G10L 15/01 |
| 9,734,839 B1 | 8/2017 | Adams | |
| 2018/0308483 A1 | 10/2018 | Myoung et al. | |
| 2019/0180752 A1 | 6/2019 | Xiao et al. | |
| 2020/0202860 A1 | 6/2020 | Gao | |

FOREIGN PATENT DOCUMENTS

| | | | | |
|---|---|---|---|---|
| CN | 103945044 A | | 7/2014 | |
| CN | 104599669 A | | 5/2015 | |
| CN | 106356059 A | | 1/2017 | |
| CN | 106992009 A | | 7/2017 | |
| CN | 107274899 A | | 10/2017 | |
| CN | 107657031 A | | 2/2018 | |
| CN | 107833573 A | | 3/2018 | |
| CN | 108831470 A | | 11/2018 | |
| CN | 109358856 A | | 2/2019 | |
| CN | 109474843 A | | 3/2019 | |
| CN | 109710129 A | | 5/2019 | |
| CN | 109901899 A | | 6/2019 | |
| CN | 110234032 A | * | 9/2019 | G06F 3/0482 |
| CN | 111052230 A | * | 4/2020 | G06F 16/3344 |
| JP | 2001221480 A | | 8/2001 | |
| JP | 2010183205 A | | 8/2010 | |
| JP | 2015535971 A | | 12/2015 | |

OTHER PUBLICATIONS

Decision to Grant Patent for corresponding Japanese patent application No. 2020-019049 dated Mar. 16, 2022 with English translation, five pages.

Reshetniak, Mykhailo et al.: "Method for Accessing and Processing Multimedia Content in a Cloud Environment", 2019 International Scientific-Practical Conference, Problems of Infocommunications, Science and Technology, IEEE, Oct. 8-11, 2019, pp. 71-76.

Trick, Suzanne et al.: "Multimodal Uncertainty Reduction for Intention Recognition in Human-Robot Interaction", IEEE/ International Conference on Intelligent Robots and Systems (IROS), Nov. 4-8, 2019, pp. 7009-7016.

Wei, Qin: "Voice-based human-computer interaction platform Design and implementation", Thesis Submitted in Partial Fulfillment of the Requirements for the Degree for the Master of Engineering, Huazhong University of Science and Technology, Abstract in English, Dec. 2018, 70 pages.

"Research and Implementation of Multimodal Dialogue Management System", with English abstract, 2014, 59 pages.

First Office Action for corresponding Chinese patent application (10 pages).

Notice of Reason for Rejection for corresponding Japanese patent application (three pages).

* cited by examiner

METHOD FOR EXITING A VOICE SKILL, APPARATUS, DEVICE AND STORAGE MEDIUM

CROSS-REFERENCE TO RELATED APPLICATION

This application claims priority to Chinese Patent Application No. 201910587670.0, filed on Jul. 2, 2019, which is hereby incorporated by reference in its entirety.

TECHNICAL FIELD

The present disclosure relates to the field of communication technology and, in particular, to a method for exiting a voice skill, an apparatus, a device and a storage medium.

BACKGROUND

In recent years, with the rapid development of artificial intelligence, intelligent voice technology has been widely used in various smart devices such as smart speakers and smart set-top boxes, and voice interaction of smart devices has also become one of the important factors attracting consumers. In the field of intelligent voice technology, voice skill specifically refer to a function or a service provided by voice, such as "check the weather" is a voice skill and "listen to music" is also a skill. Therefore, the voice skill is an abstraction of voice functions, and many disperse voice functions are abstracted into different types of voice skills.

In the prior art, when a user needs to exit a voice skill, it is necessary to clearly say which voice skill to be exited, so that the smart device can identify and execute the operation of exiting the voice skill. In the actual application process, there may be complicated situations in which the user does not clearly say which voice skill to be exited, or the user does not know the name of the voice skill, resulting in that the smart device cannot accurately identify the user's exit intention and cannot meet the user's requirement of exiting voice skills, further, leading to the poor fluency of the voice interaction and impacting the user's exit experience when using the voice skills.

SUMMARY

Embodiments of the present disclosure provide a method, an apparatus, a device and a storage medium for exiting a voice skill, so as to meet users' different exit requirements for the voice skills, enhance the fluency and convenience of user interaction with the device and improve the user's exit experience when using the voice skills.

A first aspect of the embodiments of the present disclosure provides a method for exiting a skill voice, including:

receiving a user voice instruction;

identifying a target exit intention corresponding to the user voice instruction according to the user voice instruction and a grammar rule of a preset exit intention; and executing a corresponding operation on a current voice skill of a device according to the target exit intention.

A second aspect of the embodiments of the present disclosure provides an apparatus for exiting a voice skill, including:

a receiving module, configured to receive a user voice instruction;

an intention identifying module, configured to identify a target exit intention corresponding to the user voice instruction according to the user voice instruction and a grammar rule of a preset exit intention; and an execution module, configured to execute a corresponding operation on a current voice skill of a device according to the target exit intention.

A third aspect of the embodiments of the present disclosure provides a device for exiting a voice skill, including:

a memory;

a processor; and a computer program;

wherein, the computer program is stored in the memory and configured to be executed by the processor to implement the method according to the first aspect.

A fourth aspect of the embodiments of the present disclosure provides a computer readable storage medium, storing a computer program thereon;

when the computer program is executed by a processor, the method according to the first aspect is implemented.

A method for exiting a voice skill, an apparatus, a device, and a storage medium are provided by embodiments of the present disclosure, wherein a user voice instruction is received; a target exit intention corresponding to the user voice instruction is identified according to the user voice instruction and a grammar rule of a preset exit intention; and a corresponding operation is executed on a current voice skill of a device according to the target exit intention. The embodiments of the present disclosure refine and expand the user's exit intention. After the target exit intention to which the user voice instruction belongs is identified, the corresponding operation is executed according to the target exit intention so as to meet the users' different exit requirements for the voice skills, enhance the fluency and convenience of user interaction with the device and improve the user's exit experience when using the voice skills.

BRIEF DESCRIPTION OF DRAWINGS

In order to more clearly explain embodiments of the present disclosure or the technical solutions in the prior art, the drawings used in the description of the embodiments or the prior art will be briefly introduced below. Obviously, the drawings in the following description are only some embodiments of the present disclosure. For those of the skilled in the art, other drawings can be obtained according to these drawings without any creative efforts.

DESCRIPTION OF EMBODIMENTS

In the following, the technical solutions in the embodiments of the present disclosure will be clearly and completely described with reference to the drawings in the embodiments of the present disclosure. Obviously, the described embodiments are only a part of the embodiments of the present disclosure, but not all the embodiments. Based on the embodiments of the present disclosure, all other embodiments obtained by the skilled in the art without creative efforts shall fall within the scope of the present disclosure.

Figure 1:
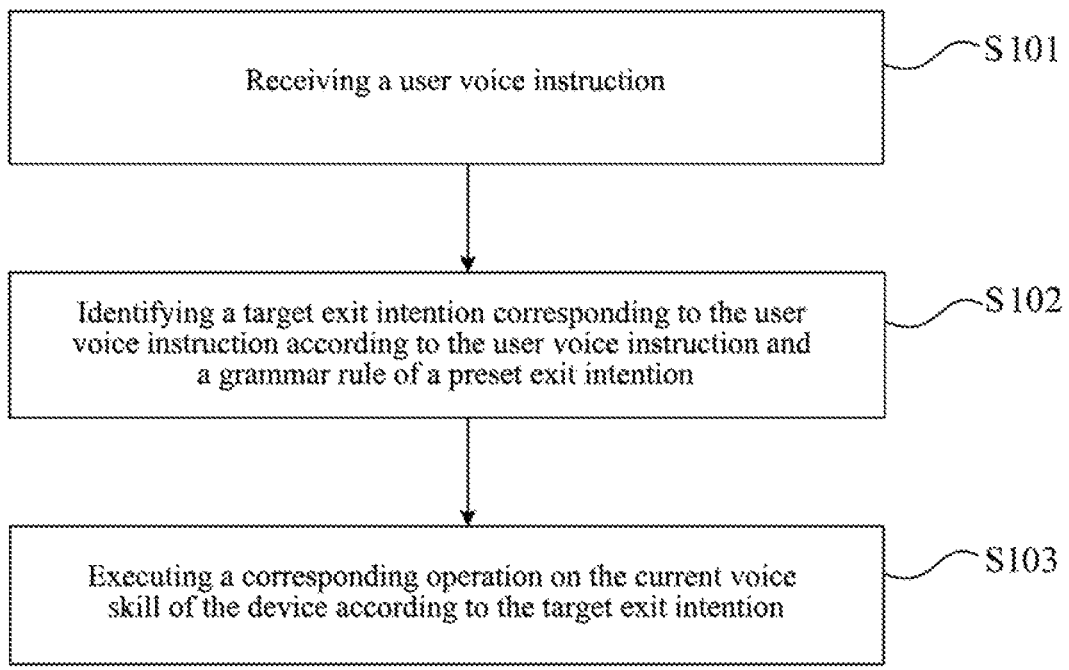
FIG. 1 is a flowchart of a method for exiting a voice skill provided by an embodiment of the present disclosure.

FIG. 1 is a flowchart of a method for exiting a voice skill provided by an embodiment of the present disclosure. This embodiment provides a method for exiting a voice skill. The specific steps of the method are as follows:

S101. Receiving a user voice instruction.

In this embodiment, the user's voice can be collected through a microphone on the device to obtain the user voice instruction. Specifically, the voice can be converted to a text by using a technology such as ASR (Automatic Speech Recognition) to obtain the user voice instruction.

S102. Identifying a target exit intention corresponding to the user voice instruction according to the user voice instruction and a grammar rule of a preset exit intention.

In this embodiment, the exit intentions can be divided into different types according to different situations in advance, for example, the exit intentions include at least one of power off intention, clear exit intention, and fuzzy exit intention and different exit intentions need the corresponding operations, in which the power off intention is clearly stated in the user voice instruction that the device needs to be powered off, for example, the user voice instruction is "power off," and the corresponding operation is to power off the device. The clear exit intention is that the user voice instruction clearly indicates that the device's current voice skill (current function or current service) need to be exited. For example, the user voice instruction is "exit it", and the corresponding operation is to exit the device's current voice skill. The fuzzy exit intention is to have the intention to exit, stop, etc., and the user voice instruction does not clearly indicate the need to exit the device's current voice skill, such as "I'm going to sleep/have a shower/work", "I will not play it", "Stop it". Since the user voice instruction of the fuzzy exit intention does not clearly indicate that the device's current voice skill needs to be exited, and its corresponding operation is more complicated than the power off intention and the clear exit intention. It needs to be analyzed based on the current voice skill of the device and the scenario. For example, the current voice skill of the device can be used to respond to the user voice instruction, or be paused, or be exited.

In this embodiment, different grammar rules are configured for different preset exit intentions, so that the user voice instruction can be matched with respective grammar rules of the preset exit intentions, thereby identifying the target exit intention corresponding to the user voice instruction. For example, the grammar rules of power off intention: "Ah/Uh/La/Yah/Wow/Well[Power off/Power off power off]", or "Ah/Uh/La/Yah/Wow/Well[Shutdown/Switch off/Turn off/Off/Power off]+[device/speaker/XiaoDu at home/XiaoDu speaker]". The grammar rule includes some keywords to match the user voice instruction. When the user voice instruction includes all the keywords of a grammar rule, it means that the user voice instruction matches the grammar rule, and then the preset exit intention corresponding to the grammar rule can be determined as the target exit instruction corresponding to the user voice instruction. In addition, during the matching process, the word segmentation is performed for the user voice instruction, and the segmentation results are matched with the keywords of the grammar rules.

S103. Executing a corresponding operation on the current voice skill of the device according to the target exit intention.

In this embodiment, the corresponding operation is executed on the current voice skill of the device according to the target exit instruction after obtaining the target exit intention corresponding to the user voice instruction. Specifically, for example, when the target exit intention is the power off intention, the device may be powered off; when the target exit intention is the clear exit intention, the current voice skill of the device is exited; when the target exit intention is the fuzzy exit intention, the corresponding operation may be executed after a further judgment.

In the method for exiting a voice skill provided by this embodiment: a user voice instruction is received; a target exit intention corresponding to the user voice instruction is identified according to the user voice instruction and grammar rules of a preset exit intention; and a corresponding operation is executed on a current voice skill of the device according to the target exit intention. This embodiment refines and expands the user's exit intention. After the target exit intention to which the user voice instruction belongs is identified, the corresponding operation is executed according to the target exit intention so as to meet the users' different exit requirements for the voice skills, enhance the fluency and convenience of user interaction with the device and improve the user's exit experience when using the voice skill.

Based on the above embodiment, executing a corresponding operation on the current voice skill of the device according to the target exit intention described in S103 specifically includes:

If the identified target exit intention is the power off intention, then powering off the device according to the power off intention.

In this embodiment, the grammar rules of the power off intention can be configured in advance, which can be specifically as follows:

Ah/Uh/La/Yah/Wow/Well [Power off/Power off power off]

Ah/Uh/La/Yah/Wow/Well[Shutdown/Switch off/Turn off/Off/Power off]+[device/speaker/XiaoDu at home/XiaoDu speaker]

Ah/Uh/La/Yah/Wow/Well[Give me/I want/I'd like/Can/You/You can/Can you/Please/Excuse me] [power off]

Ah/Uh/La/Yah/Wow/Well[Give me/I want/I'd like/Can/You/You can/Can you/Please/Excuse me] [Shutdown/Switch off/Turn off/Off]+[device/speaker/XiaoDu at home/XiaoDu speaker]

The above grammar rules need to clearly include keywords such as "power off" and "power off the device", otherwise it is impossible to accurately determine whether the user really has the power off intention, which will lead to an improper power off. In this embodiment, the user voice instruction can be matched with the above grammar rules. If the user voice instruction can be matched, then the target exit intention corresponding to the user voice instruction can be determined as the power off intention, and the device can be further powered off according to the power off intention. In addition, the user voice instruction may also include relevant parameters for the device to power off, such as the power off time, restart time, etc. After determining that the target exit intention is the power off intention, the relevant parameters for the power off can be fetched from the user voice instruction, and then the device is powered off according to the relevant parameters for the power off.

On the basis of any of the above-mentioned embodiments, executing a corresponding operation on the current voice skill of the device according to the target exit intention described in S103 includes:

If the identified target exit intention is the clear exit intention, then exiting the current voice skill of the device according to the clear exit intention.

In this embodiment, the grammar rules of the clear exit intention can be configured in advance, which can be specifically as follows:

Ah/Uh/La/Yah/Wow/Well [Exit/Exit Exit/Leave/Shutdown/Switch off]

Ah/Uh/La/Yah/Wow/Well[Exit/Exit Exit/Leave/Shutdown/Switch off]+[skill/service/app/game]

Ah/Uh/La/Yah/Wow/Well [Give me/I want/I'd like/Can/You/You can/Can you/Please/Excuse me]+[Exit/Exit Exit/Leave/Shutdown/Switch off]

Ah/Uh/La/Yah/Wow/Well [Give me/I want/I'd like/Can/You/You can/Can you/Please/Excuse me]+[Exit/Exit Exit/Leave/Shutdown/Switch off]+[skill/service/app/game]

The above grammar rules need to clearly include keywords such as "exit" and "shutdown skill", otherwise it is impossible to accurately determine whether the user really has the intention to exit the voice skill, that is, it is impossible to accurately determine whether it is a clear exit intention, which will lead to an improper exit. In this embodiment, the user voice instruction can be matched with the above grammar rules. If the user voice instruction can be matched, then the target exit intention corresponding to the user voice instruction can be determined as the clear exit intention, furthermore the current voice skill of the device can be exited according to the clear exit intention.

On the basis of any of the above-mentioned embodiments, executing a corresponding operation on the current voice skill of the device according to the target exit intention described in S103 includes:

If the identified target exit intention is the fuzzy exit intention, then judging whether the current voice skill of the device can respond to the user voice instruction;

If the current voice skill of the device can respond to the user voice instruction, a response operation corresponding to the user voice instruction is executed by the current voice skill of the device; and/or If the current voice skill of the device cannot respond to the user voice instruction, then exiting the current voice skill of the device.

In this embodiment, the grammar rules of the fuzzy exit intention can be configured in advance, which can be specifically as follows:

Ah/Uh/La/Yah/Wow/Well[Return/Rest/Take a rest/Sleep/Asleep/Bath/Do Homework/Work]

Ah/Uh/La/Yah/Wow/Well[I want/I'd like/Can/You/You can/Can you/Please/Excuse me]+[Return/Rest/Take a rest/Sleep/Asleep]

Ah/Uh/La/Yah/Wow/Well[I want/I'd like/I will/I]+[Bath/Do Homework/Work]

Ah/Uh/La/Yah/Wow/Well[Don't play/Don't want/Don't/No]+[Play]

The above grammar rules do not clearly include the keywords to exit voice skills, but have a certain exit intention. Since the current voice skill of the device may also be able to respond to the user voice instruction that meets the above grammar rules, for example, the user voice instruction is "I want to sleep", and the device's current voice skill can respond to the user voice instruction, such as playing lullaby, bedtime stories, etc. At this time, if the device's current voice skill is exited, the user's requirement for playing lullaby and bedtime stories will not be met. Therefore, when the user voice instruction can match the above grammar rules, it is necessary to determine whether the current voice skill can respond to the user voice instruction, if the current voice skill can respond to the user voice instruction, the device's current voice skill can execute the response operation corresponding to the user voice instruction; if the current voice skill cannot respond to the user voice instruction, the device's current voice skill is exited.

It should be noted if it is determined that the current voice skill of the device can respond to the user voice instruction, which operation to be executed can be determined according to the priorities which are preset by the user between two operations of responding by the current voice skill and exiting the current voice skill of the device. For example, the above-mentioned user voice instruction is "I'm going to sleep". If the device's current voice skill can respond to the user voice instruction, but the priority of exiting the device's current voice skill is set higher than the priority of responding by the current voice skill, it will exit the current voice skill preferentially, although the current voice skill can respond to "I'm going to sleep" by playing lullaby, bedtime stories, etc.

On the basis of any of the above-mentioned embodiments, executing a corresponding operation on the current voice skill of the device according to the target exit intention described in S103 includes:

If the identified target exit intention is the fuzzy exit intention, then judging a scenario of the current voice skill of the device;

If the scenario of the current voice skill of the device is a multimedia playing scenario, then pausing the multimedia playing; and/or If the scenario of the current voice skill of the device is not a multimedia playing scenario, then exiting the current voice skill of the device.

In this embodiment, the grammar rules of the fuzzy exit intention can be configured in advance, which can be specifically as follows:

Ah/Uh/La/Yah/Wow/Well[Stop/to Stop/Stopping/Pause]

Ah/Uh/La/Yah/Wow/Well [Stop/to Stop/Stopping/Pause]+[skill/service/app/game/pass through/answer]

Ah/Uh/La/Yah/Wow/Well [I want/I'd like/Can/You/You can/Can you/Please/Excuse me]+[Stop/to Stop/Stopping/Pause]+[skill/service/app/game/pass through/answer]

[Don't talk/Don't say/Stop talking/Stop saying/No speaking/Shut up/zip it/close your mouth/Stop arguing/No talking]

The above-mentioned grammar rules also do not clearly include the keywords to exit the voice skill, but they also have a certain exit intention. When the user voice instruction matches the above-mentioned grammar rules, the scenario of the current voice skill of the device can be obtained, and the corresponding operation can be performed according to the scenario of the current voice skill. Specifically, if the device's current voice skill is the multimedia playing scenario, such as playing music, videos, games, passing through, answering questions, etc., then the multimedia playing may be paused according to the user voice instruction; if it is not the above-mentioned multimedia playing scenario, then the current voice skill of the device may be exited, so that the different operations for users to pause in the multimedia playing scenario and exit the device's current voice skill in other scenarios can be implemented.

Further, on the basis of the above-mentioned embodiment, when the identified target exit intention is the fuzzy exit intention, it can also first determine whether the current voice skill of the device can respond to the user voice instruction. If the current voice skill of the device can respond, the current voice skill of the device executes a response operation corresponding to the user voice instruction; if the current voice skill of the device cannot respond, it is determined whether the scenario of the current voice skill of the device is the multimedia playing scenario, and if the scenario of the current voice skill of the device is the multimedia playing scenario, the multimedia playing is paused; if the scenario of the current voice skill of the device is not the multimedia playing scenario, then the current voice skill of the device is exited.

Based on the above-mentioned embodiment, when the preset exit intention includes the power off intention, the clear exit intention, and the fuzzy exit intention, the priority of the power off intention can be set highest, the priority of the clear exit intention is second, and the priority of the fuzzy exit intention is the lowest. That is, when the match is executed, the user voice instruction is first matched with the grammar rules of the power off intention, and if the match is successful, no other preset exit intention match is required; if the match is not successful, the user voice instruction is matched with the grammar rules of the clear exit intention. Similarly, if the match is successful, it is not necessary to match the grammar rules of the fuzzy exit intention; if the match is not successful, and then finally it needs to match with the grammar rules of the fuzzy exit intention.

Figure 2:
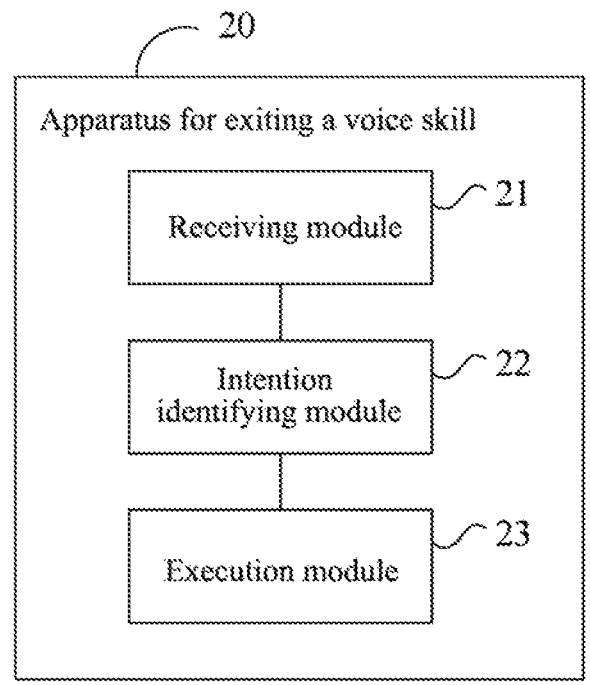
FIG. 2 is a structure diagram of an apparatus for exiting a voice skill provided by an embodiment of the present disclosure.

FIG. 2 is a structure diagram of an apparatus for exiting a voice skill provided by an embodiment of the present disclosure. The apparatus for exiting the voice skill provided in this embodiment can execute the processing flow provided by the embodiment of the method for exiting the voice skill. As shown in FIG. 2, the apparatus for exiting the voice skill includes a receiving module 21, an intention identifying module 22, and an execution module 23.

The receiving module 21 is configured to receive a user voice instruction;

The intention identifying module 22 is configured to identify a target exit intention corresponding to the user voice instruction according to the user voice instruction and a grammar rule of a preset exit intention;

The execution module 23 is configured to execute a corresponding operation on a current voice skill of a device according to the target exit intention.

Based on any of the above-mentioned embodiments, the preset exit intention includes at least one of a power off intention, a clear exit intention, and a fuzzy exit intention.

Based on any of the above-mentioned embodiments, the execution module 23 is configured to:

If the identified target exit intention is the power off intention, then power off the device according to the power off intention.

Based on any of the above embodiments, the execution module 23 is configured to:

If the identified target exit intention is the clear exit intention, then exit the current voice skill of the device according to the clear exit intention.

Based on any of the above embodiments, the execution module 23 is configured to:

If the identified target exit intention is the fuzzy exit intention, then judge whether the current voice skill of the device can respond to the user voice instruction;

If the current voice skill of the device can respond, execute, by the current voice skill of the device, a response operation corresponding to the user voice instruction; and/or If the current voice skill of the device cannot respond, then exit the current voice skill of the device.

Based on any of the above-mentioned embodiments, the execution module 23 is configured to:

If the identified target exit intention is the fuzzy exit intention, then judge a scenario of the current voice skill of the device;

If the scenario of the current voice skill of the device is a multimedia playing scenario, then pause a multimedia playing; and/or If the scenario of the current voice skill of the device is not the multimedia playing scenario, then exit the current voice skill of the device.

The apparatus for exiting a voice skill provided by the embodiments of the present disclosure may be specifically used to execute the above-mentioned method embodiments provided in FIG. 1, and specific functions are not described herein again.

In the apparatus for exiting the voice skill according to the embodiment of the present disclosure, a user voice instruction is received; a target exit intention corresponding to the user voice instruction is identified according to the user voice instruction and grammar rules of a preset exit intention; then a corresponding operation is executed on the current voice skill of the device according to the target exit intention. The embodiment refines and expands the user's exit intention. After the target exit intention to which the user voice instruction belongs is identified, the corresponding operation is executed according to the target exit intention so as to meet the users' different exit requirements for the voice skills, enhance the fluency and convenience of user interaction with the device and improve the user's exit experience when using the voice skills.

Figure 3:
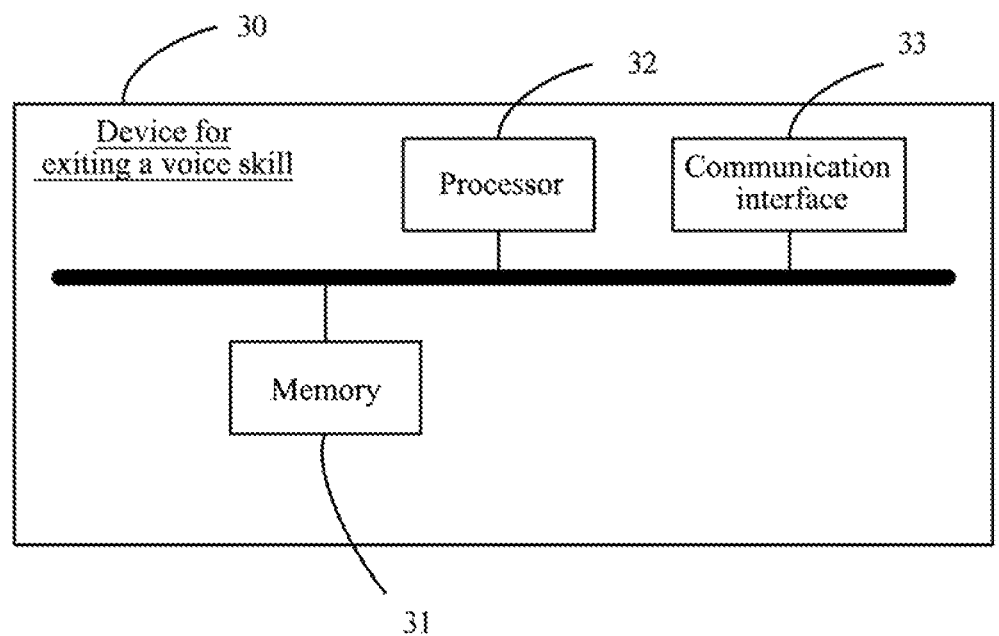
FIG. 3 is a structure diagram of a device for exiting a voice skill provided by an embodiment of the present disclosure.

FIG. 3 is a structure diagram of a device for exiting a voice skill provided by an embodiment of the present disclosure. The device for exiting a voice skill provided by the embodiment of the present disclosure can execute the processing flow provided by the embodiment of method for exiting the voice skill. As shown in FIG. 3, the device 30 for exiting a voice skill includes a memory 31, a processor 32, a computer program, and a communication interface 33; wherein the computer program is stored in the memory 31, and is configured to execute, by the processor 32, the method for exiting a voice skill described in the above embodiment.

The device for exiting a voice skill of the embodiment shown in FIG. 3 may be used to execute the technical solutions of the above-mentioned method embodiments, and the implementation principles and technical effects thereof are similar, and details are not described herein again.

In addition, this embodiment also provides a computer-readable storage medium on which a computer program is stored, and the computer program is executed by a processor to implement the method for exiting a voice skill according to the embodiment.

In the several embodiments provided by the present disclosure, it should be understood that the disclosed apparatus and method may be implemented in other ways. For example, the apparatus embodiments described above are only schematic. For example, the division of the unit is only a logical function division. In actual implementation, there may be another division manner. For example, multiple units or components may be combined or integrated into another system, or some features can be ignored or not implemented. In addition, the displayed or discussed mutual coupling or direct coupling or communication connection may be indirect coupling or communication connection through some interfaces, devices or units, which may be electrical, mechanical or other forms.

The units described as separate components may or may not be physically separated, and the components displayed as units may or may not be physical units, that is, may be located in one place, or may be distributed on multiple network units. Some or all of the units may be selected according to actual needs to achieve the objective of the solution of this embodiment.

In addition, each functional unit in each embodiment of the present disclosure may be integrated into one processing unit, or each unit may exist separately physically, or two or more units may be integrated into one unit. The above integrated unit may be implemented in the form of hardware, or in the form of a combination of hardware and software functional units.

The above integrated unit implemented in the form of a software functional unit may be stored in a computer-readable storage medium. The above software functional unit is stored in a storage medium and includes several instructions for causing a computer device (which may be a personal computer, a server, or a network device) or a processor to execute some steps of the methods described in the embodiments of the present disclosure. The above-mentioned storage media include: U disks, mobile hard disks, read-only memory (ROM), random access memory (RAM), magnetic disks, or compact discs, etc., which can store program codes.

Those skilled in the art can clearly understand that for the convenience and brevity of the description, only the above-mentioned division of the functional modules is used as an example. In practical applications, the above-mentioned functions can be allocated by different functional modules according to needs. The internal structure of the apparatus is divided into different functional modules to complete all or part of the functions described above. For the specific working process of the apparatus described above, reference may be made to the corresponding process in the above-mentioned method embodiments, and details are not described herein again.

Finally, it should be noted that the above embodiments are only used to illustrate the technical solutions of the present disclosure, but not limited thereto. Although the present disclosure has been described in detail with reference to the above-mentioned embodiments, those skilled in the art should understand that: the technical solutions described in the above-mentioned embodiments can still be modified, or some or all of the technical features can be equivalently replaced; and these modifications or replacements do not deviate the essence of the corresponding technical solutions from those of the scope of the technical solutions of the embodiments.

What is claimed is:

1. A method for exiting a voice skill, comprising:
   receiving a user voice instruction;
   identifying a target exit intention corresponding to the user voice instruction according to the user voice instruction and a grammar rule of a preset exit intention, wherein, the preset exit intention comprises at least one of power off intention, clear exit intention, and fuzzy exit intention; and
   executing a corresponding operation on a current voice skill of a device according to the target exit intention,
   wherein, the executing a corresponding operation on a current voice skill of a device according to the target exit intention comprises:
   if the identified target exit intention is the fuzzy exit intention, judging a scenario of the current voice skill of the device;
   if the scenario of the current voice skill of the device is a multimedia playing scenario, pausing a multimedia playing; and
   if the scenario of the current voice skill of the device is not the multimedia playing scenario, exiting the current voice skill of the device.

2. The method according to claim 1, wherein, the executing a corresponding operation on a current voice skill of a device according to the target exit intention, comprises:
   if the identified target exit intention is the power off intention, powering off the device according to the power off intention.

3. The method according to claim 1, wherein, the executing a corresponding operation on a current voice skill of a device according to the target exit intention, comprises:
   if the identified target exit intention is the clear exit intention, exiting the current voice skill of the device according to the clear exit intention.

4. The method according to claim 1, wherein, the executing a corresponding operation on a current voice skill of a device according to the target exit intention, comprises:
   if the identified target exit intention is the fuzzy exit intention, judging whether the current voice skill of the device can respond to the user voice instruction;
   if the current voice skill of the device can respond to the user voice instruction, executing, by the current voice skill of the device, a response operation corresponding to the user voice instruction; and
   if the current voice skill of the device cannot respond to the user voice instruction, exiting the current voice skill of the device.

5. The method according to claim 1, wherein, priorities among the power off intention, the clear exit intention and the fuzzy exit intention are set to determine, according to which one of the power off intention, the clear exit intention and the fuzzy exit intention to execute a corresponding operation, wherein, a priority of the power off intention is set the highest, a priority of the clear exit intention is set the second, and a priority of the fuzzy exit intention is set the lowest.

6. A device for exiting a voice skill, comprising a memory, a processor, and a computer program; the computer program is stored in the memory and configured to be executed by the processor to cause the processor to:
   receive a user voice instruction;
   identify a target exit intention corresponding to the user voice instruction according to the user voice instruction and a grammar rule of a preset exit intention, wherein, the preset exit intention comprises at least one of power off intention, clear exit intention, and fuzzy exit intention; and
   execute a corresponding operation on a current voice skill of a device according to the target exit intention,
   wherein, the processor is further caused to:
   if the identified target exit intention is the fuzzy exit intention, judge a scenario of the current voice skill of the device;
   if the scenario of the current voice skill of the device is a multimedia playing scenario, pause a multimedia playing; and
   if the scenario of the current voice skill of the device is not the multimedia playing scenario, exit the current voice skill of the device.

7. The device according to claim 6, wherein the processor is further caused to:
   if the identified target exit intention is the power off intention, power off the device according to the power off intention.

8. The device according to claim 6, wherein the processor is further caused to:

if the identified target exit intention is the clear exit intention, exit the current voice skill of the device according to the clear exit intention.

9. The device according to claim 6, wherein the processor is further caused to:
if the identified target exit intention is the fuzzy exit intention, judge whether the current voice skill of the device can respond to the user voice instruction;
if the current voice skill of the device can respond to the user voice instruction, execute, by the current voice skill of the device, a response operation corresponding to the user voice instruction; and
if the current voice skill of the device cannot respond to the user voice instruction, exit the current voice skill of the device.

10. The device according to claim 6, wherein, priorities among the power off intention, the clear exit intention and the fuzzy exit intention are set to determine, according to which one of the power off intention, the clear exit intention and the fuzzy exit intention to execute a corresponding operation, wherein, a priority of the power off intention is set the highest, a priority of the clear exit intention is set the second, and a priority of the fuzzy exit intention is set the lowest.

11. A non-transitory computer readable storage medium, storing a computer program thereon, when the computer program is executed by a processor, operations are executed, the operations comprising:
receiving a user voice instruction;
identifying a target exit intention corresponding to the user voice instruction according to the user voice instruction and a grammar rule of a preset exit intention, wherein, the preset exit intention comprises at least one of power off intention, clear exit intention, and fuzzy exit intention; and
executing a corresponding operation on a current voice skill of a device according to the target exit intention,
wherein, the executing a corresponding operation on a current voice skill of a device according to the target exit intention comprises:
if the identified target exit intention is the fuzzy exit intention, judging a scenario of the current voice skill of the device;
if the scenario of the current voice skill of the device is a multimedia playing scenario, pausing a multimedia playing; and
if the scenario of the current voice skill of the device is not the multimedia playing scenario, exiting the current voice skill of the device.

12. The non-transitory computer readable storage medium according to claim 11, wherein, the executing a corresponding operation on a current voice skill of a device according to the target exit intention, comprises:
if the identified target exit intention is the power off intention, powering off the device according to the power off intention.

13. The non-transitory computer readable storage medium according to claim 11, wherein, the executing a corresponding operation on a current voice skill of a device according to the target exit intention, comprises:
if the identified target exit intention is the clear exit intention, exiting the current voice skill of the device according to the clear exit intention.

14. The non-transitory computer readable storage medium according to claim 11, wherein, the executing a corresponding operation on a current voice skill of a device according to the target exit intention, comprises:
if the identified target exit intention is the fuzzy exit intention, judging whether the current voice skill of the device can respond to the user voice instruction;
if the current voice skill of the device can respond to the user voice instruction, executing, by the current voice skill of the device, a response operation corresponding to the user voice instruction; and
if the current voice skill of the device cannot respond to the user voice instruction, exiting the current voice skill of the device.

15. The non-transitory computer readable storage medium according to claim 11, wherein, priorities among the power off intention, the clear exit intention and the fuzzy exit intention are set to determine, according to which one of the power off intention, the clear exit intention and the fuzzy exit intention to execute a corresponding operation, wherein, a priority of the power off intention is set the highest, a priority of the clear exit intention is set the second, and a priority of the fuzzy exit intention is set the lowest.

* * * * *